US012244715B2

United States Patent
Gopi et al.

(10) Patent No.: US 12,244,715 B2
(45) Date of Patent: Mar. 4, 2025

(54) USING SECONDARY BLOCKCHAIN ADDRESSES TO PREVENT MALICIOUS TRANSFERS

(71) Applicant: Capital One Services, LLC, McLean, VA (US)

(72) Inventors: Anoop Gopi, Herndon, VA (US); Lesley Newton, Richmond, VA (US); Christina Song, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 282 days.

(21) Appl. No.: 18/057,694

(22) Filed: Nov. 21, 2022

(65) Prior Publication Data

US 2024/0171399 A1    May 23, 2024

(51) Int. Cl.
*H04L 9/08*    (2006.01)
*H04L 9/00*    (2022.01)
*H04L 9/32*    (2006.01)

(52) U.S. Cl.
CPC .......... *H04L 9/3213* (2013.01); *H04L 9/0866* (2013.01); *H04L 9/50* (2022.05)

(58) Field of Classification Search
CPC ........ H04L 9/3213; H04L 9/50; H04L 9/0866
See application file for complete search history.

(56) References Cited

U.S. PATENT DOCUMENTS

| 11,727,401 | B1 * | 8/2023 | Winklevoss | ............. | H04L 9/50 705/50 |
| 2021/0075591 | A1 * | 3/2021 | Prokopenya | ....... | G06Q 20/3678 |
| 2023/0412639 | A1 * | 12/2023 | Xu | ......... | G06N 20/00 |

* cited by examiner

*Primary Examiner* — Daniel B Potratz
(74) *Attorney, Agent, or Firm* — Foley & Lardner LLP

(57) ABSTRACT

Methods and systems are described herein for a transfer authorization system that may monitor for transfer requests for secondary cryptographic addresses maintained for one or more primary cryptographic addresses. When a transfer request is received, the transfer authorization system may determine that the transfer request is for a secondary cryptographic address. Based on that determination, the transfer authorization system may determine that the source cryptographic address of the request is authorized to receive control of cryptographic tokens from the secondary cryptographic address and that the request is associated with the source cryptographic address. The transfer authorization system may then transfer control of one or more cryptographic tokens from an associated primary cryptographic address to the secondary cryptographic address, and upon the successful transfer, may also transfer control of the one or more tokens to the requestor.

20 Claims, 7 Drawing Sheets

200

| 203 | Source Address | 0x19dE91Af973F404EDF5B4c093983a7c6E3EC8ccE |
|---|---|---|
| 206 | Target Address | 0x19dE91Af973F404EDF5B4c093983a7c6Ebbb3ba |
| 209 | Cryptographic Signature | Signature_Data |

| | |
|---|---|
| Primary Address | 0x19dE91Af973F404EDF5B4c0939 83a7c6E3EC8xxE |
| Secondary Address | 0x19dE91Af973F404EDF5B4c0939 83a7c6Ebbb3ba |
| Secondary Address | DKsT4WW64UtAAvfTE/ 1uxxYpolSdjE4vRoVV9qFxBUI= |

303 — Primary Address
306 — Secondary Address
309 — Secondary Address

| Secondary Address | Allowed Target |
|---|---|
| 0x19dE91Af973F404EDF5B4c093983a7c6E3EC8ccE | 0x19dE91Af973F404EDF5B4c093983a7c6E3ECLois |
| 0x19dE91Af973F404EDF5B4c093983a7c6E3EC8ddA | 0x19dE91Af973F404EDF5B4c093983a7c6E3EC8ZZZ |
| 0x19dE91Af973F404EDF5B4c093983a7c6E3EC8gh1 | 0x19dE91Af973F404EDF5B4c093983a7c6E3EC8ABC |

403 — Secondary Address
406 — Allowed Target
409

FIG. 4

USING SECONDARY BLOCKCHAIN ADDRESSES TO PREVENT MALICIOUS TRANSFERS

BACKGROUND

In recent years, the use of blockchain technology for various applications including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules.

However, despite these benefits and the wide-ranging number of potential applications, practical implementations of blockchain technology have been hindered by several problems. In particular, although blockchain technology provides certain anonymity to users, blockchain transactions are visible to anyone who is able to query a blockchain node. Thus, any person including a malicious user with a computer is able to get blockchain information. Thus, when a malicious user detects that a particular blockchain address controls certain cryptographic tokens, that malicious user may attempt to gain control of those tokens whether by social engineering or other methods, especially when the malicious user identifies target blockchain addresses for token transfers. Accordingly, it may be advantageous to use secondary blockchain addresses to restrict transfers of control of cryptographic tokens from certain blockchain addresses, and also transfer control of cryptographic tokens to those secondary blockchain addresses as needed so that those addresses appear to not control cryptographic tokens.

SUMMARY

One mechanism for preventing malicious transfers may use secondary cryptography-based storage applications or secondary cryptographic addresses. Therefore, methods and systems are described herein for using secondary cryptography-based storage applications to prevent malicious transfers of control of cryptographic tokens from a primary cryptography-based storage application. In particular, a transfer authorization system may be used per operation for preventing malicious transfers. The transfer authorization system may monitor for cryptographic token transfer requests for different secondary cryptographic addresses configured for one or more primary cryptographic addresses. When a transfer request is received, the transfer authorization system may determine that the transfer request is for a secondary cryptographic address. Based on that determination, the transfer authorization system may determine whether the source cryptographic address of the request is authorized to receive control of cryptographic tokens from the secondary cryptographic address and whether the request is associated with the source cryptographic address. In response to the determining that the request is authorized and is associated with the source cryptographic address, the transfer authorization system may transfer control of one or more cryptographic tokens from an associated primary cryptographic address to the secondary cryptographic address, and upon the successful transfer, also transfer control of the one or more tokens to the requestor.

In some embodiments, the transfer authorization system may receive a transfer request for transferring control of one or more cryptographic tokens from a first cryptographic address to a second cryptographic address. For example, the transfer request may be generated by a requesting computing device and may be transmitted to the transfer authorization system. The transfer request may include a source address (the first cryptographic address) of a source cryptography-based storage application and a target address (the second cryptographic address) of a target cryptography-based storage application. In some embodiments, the request may include a mechanism for authenticating the request (e.g., via a cryptographic signature associated with the first address).

The transfer authorization system may then determine that the first cryptographic address is a secondary cryptographic address associated with a primary cryptographic address that controls the one or more cryptographic tokens. For example, when a user accesses the transfer authorization system, the user may register a primary cryptographic address that may be enabled to register or generate one or more secondary cryptographic addresses used to transfer cryptographic tokens to particular entities. In some embodiments, the user may be enabled to select entities and or one or more cryptographic addresses to which transfers from various secondary cryptographic addresses are allowed. Thus, the transfer authorization system may identify the primary cryptographic address associated with the secondary cryptographic address.

In some embodiments, to determine that the first cryptographic address is a secondary cryptographic address, the transfer authorization system may perform a lookup to determine that the first cryptographic address does not control any cryptographic tokens. In some embodiments, the transfer authorization system may determine whether there is a link (e.g., in a database or another data structure) between the secondary cryptographic address and a particular primary cryptographic address to make the determination.

The transfer authorization system may then determine whether a token transfer is permitted between the cryptographic addresses. In particular, the transfer authorization system may, in response to determining that the first cryptographic address is the secondary cryptographic address, determine based on the first cryptographic address and the second cryptographic address that transfer of control is permitted from the first cryptographic address to the second cryptographic address. For example, the transfer authorization system may perform a lookup of all cryptographic addresses allowed as transfer targets for the particular secondary cryptographic address and make the determination of whether the cryptographic address associated with the request is on the allowed address list.

When the request is authorized, the transfer authorization system may then transfer requested cryptographic tokens to be controlled by the secondary cryptographic address. In particular, the transfer authorization system may generate a blockchain function request for transferring control of the one or more cryptographic tokens controlled using the primary cryptographic address to be controlled using the first cryptographic address. For example, the transfer of control may be performed on the blockchain. Thus, the blockchain function request may be sent to a blockchain node that may execute the request. That is, the transfer authorization system may transmit the blockchain function request to be executed by a blockchain node. As a result, control of the cryptographic tokens may be changed from the primary cryptographic address to the secondary cryptographic address.

When the blockchain function request is executed, the transfer authorization system may perform another blockchain function transferring control of the cryptographic tokens to the requestor (e.g., a cryptographic address associated with the requestor). In particular, the transfer authorization system may, based on the blockchain function request being successful, perform the transfer request using the blockchain node. For example, the transfer authorization system may generate another blockchain function for transferring control of the cryptographic tokens. The blockchain function may include a cryptographic signature of the source of the cryptographic tokens (e.g., a cryptographic signature associated with the secondary blockchain address) and the target blockchain address that may control the cryptographic tokens after the transfer.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a portion of a data structure for a transfer request, in accordance with one or more embodiments of this disclosure.

FIG. 3 illustrates a portion of a data structure representing links between a primary cryptographic address and associated secondary cryptographic addresses, in accordance with one or more embodiments of this disclosure.

FIG. 4 illustrates a data structure representing permissions for transferring control of cryptographic tokens from secondary cryptographic addresses, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
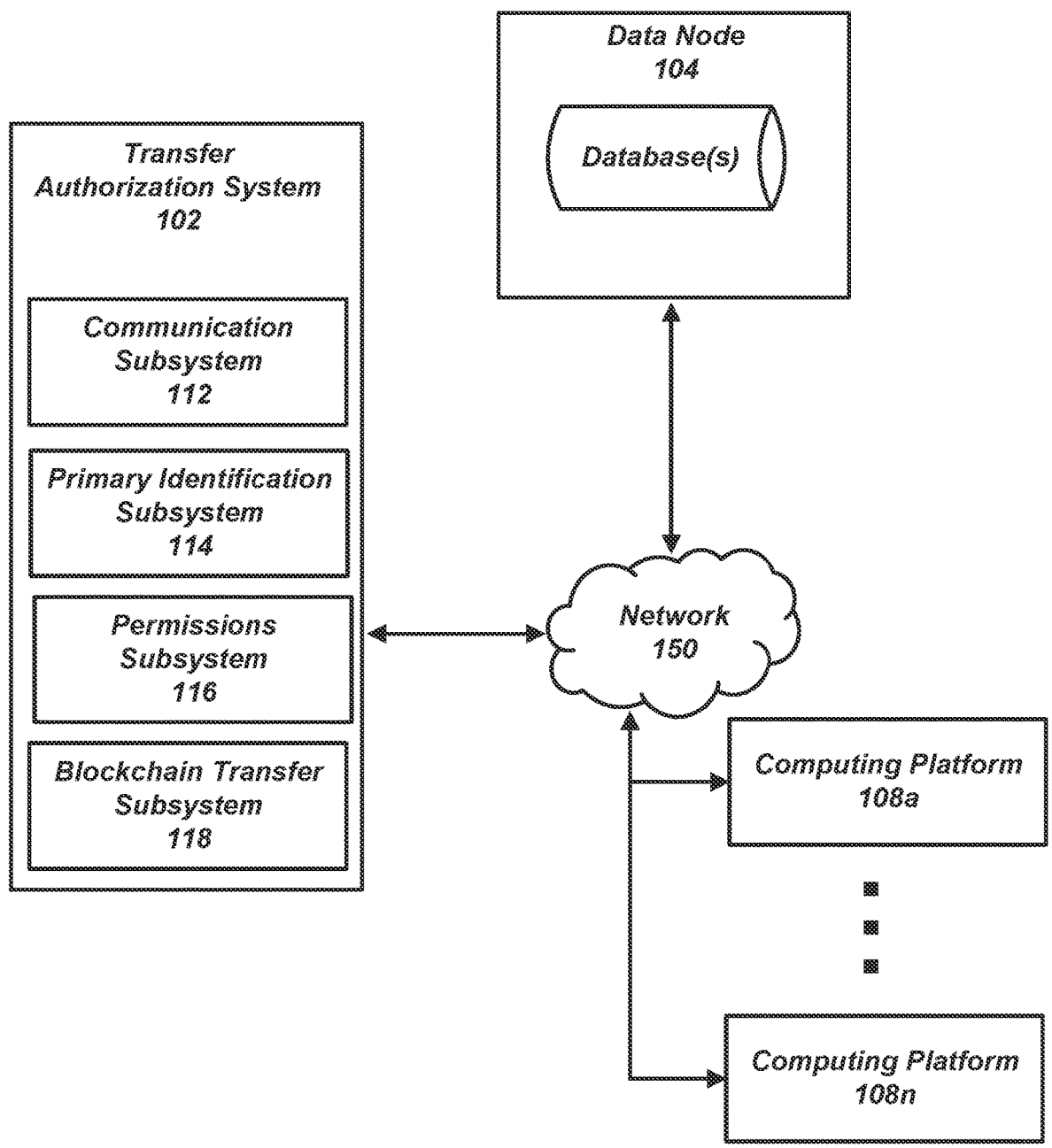
FIG. 1 shows an illustrative system for preventing malicious transfers of control of cryptographic tokens, in accordance with one or more embodiments of this disclosure.

FIG. 1 is an example of environment 100 for preventing malicious transfers of control of cryptographic tokens. Environment 100 includes transfer authorization system 102, data node 104, and computing platforms 108a-108n. Transfer authorization system 102 may execute instructions for preventing malicious transfers of control of cryptographic tokens. Transfer authorization system 102 may include software, hardware, or a combination of the two. For example, transfer authorization system 102 may be hosted on a physical server or a virtual server that is running on a physical computer system. In some embodiments, transfer authorization system 102 may be configured on a user device (e.g., a laptop computer, a smartphone, a desktop computer, an electronic tablet, or another suitable user device). In some embodiments, transfer authorization system 102 may be hosted on a blockchain and may execute operations on a blockchain node. For example, transfer authorization system 102 may be a smart contract or another on-chain program that is being executed by a blockchain node. In some embodiments, transfer authorization system 102 may be hosted on an independent computing device and may send requests to the blockchain node to execute instructions (e.g., retrieve cryptographic tokens, mint cryptographic tokens, etc.).

Computing platforms 108a-108n may be platforms related to various entities that are able to request and process transfers of control of cryptographic tokens. For example, entities may allow the exchange of cryptographic tokens for goods or services. Thus, a user may have a primary cryptographic address associated with a primary cryptography-based storage application that the user may use to transact with various entities. To prevent unauthorized transfers, the user may add secondary cryptographic addresses to be controlled by either the primary cryptography-based storage application or secondary cryptography-based storage application. For example, the user may transact with different entities (e.g., vendors) and may want to separate blockchain functions (e.g., transactions) from the different entities for reasons to be discussed later in this disclosure. Thus, the user may use secondary cryptographic addresses (e.g., one for each vendor or a set of vendors). For example, for a vendor supplying a particular component of a product the user may use one secondary cryptographic address. For another vendor supplying a different component or a different type of component, the user may use another secondary cryptographic address. Those secondary cryptographic addresses may be linked to one or more primary cryptographic addresses. Each primary cryptographic address may be linked to one or more secondary cryptographic addresses and may transfer cryptographic tokens to be controlled by those secondary cryptographic addresses as needed. For example, a vendor may request control of one or more cryptographic tokens in exchange for a particular number of components or parts and the transfer authorization system may provide control of those cryptographic tokens to the vendor as described further in this disclosure.

Use of secondary cryptographic addresses may have various security advantages in addition to the organizational advantages described above. For example, each secondary cryptographic address may be restricted to transferring control of cryptographic tokens to only a particular (or a set of) target cryptographic addresses (e.g., one or more cryptographic addresses associated with a particular entity supplying a particular component). Thus, preventing attackers from doing any transfers of control to unknown cryptographic addresses. In addition, secondary cryptographic addresses may not control any cryptographic tokens as a general state. Control of the right number of cryptographic tokens may be transferred to the secondary cryptographic addresses when a transaction is performed. That control may then be transferred to a requesting party, leaving the secondary cryptographic address with no tokens to control. As a result, any malicious user analyzing the blockchain may not be interested in those secondary cryptographic addresses, thus making the use of cryptographic transactions safer.

Data node 104 may store various data, including user data (e.g., registration data for user/client devices), function data for each service available within transfer authorization system 102, and/or other suitable data. Data node 104 may include software, hardware, or a combination of the two. For example, data node 104 may be a physical server or a virtual server that is running on a physical computer system. In some embodiments, transfer authorization system 102 and data node 104 may reside on the same hardware and/or the same virtual server/computing device. Network 150 may be a local area network, a wide area network (e.g., the Internet), or a combination of the two.

Transfer authorization system 102 may receive a transfer request for transferring control of one or more cryptographic tokens from a first cryptographic address to a second cryptographic address. In some embodiments, transfer authorization system 102 may receive the transfer request using communication subsystem 112. Communication subsystem 112 may include software components, hardware components, or a combination of both. For example, communication subsystem 112 may include a network card (e.g., a wireless network card and/or a wired network card) that is associated with software to drive the card. For example, a user may want to use a cryptocurrency (e.g., cryptographic tokens) to purchase a product or a service from a vendor. Thus, during the purchase process the user (e.g., the user device) may provide a cryptographic address to the vendor to use as a settlement vehicle (e.g., a particular secondary cryptographic address) that the user may associate with the vendor (or a set of vendors).

In some embodiments, the transfer request may be a request to transfer control of one or more cryptographic tokens from a source cryptography-based storage application associated with a user to a target cryptography-based storage application associated with a requestor of the first blockchain function request. For example, the target cryptography-based storage application may be associated with a vendor while the source cryptography-based storage application may be associated with a user acquiring products or services. The source cryptography-based storage application may be associated with a secondary cryptographic address. That is, the source cryptography-based storage application may use a private key to transfer control of cryptographic tokens from a secondary cryptographic address to a different cryptographic address (e.g., a cryptographic address associated with a vendor).

In some embodiments, the first blockchain function request may include a source address of the source cryptography-based storage application and a target address of the target cryptography-based storage application. Transfer authorization system 102 may use the source and target addresses to authorize the transaction and may transfer control of one or more cryptographic tokens to the target address. In addition, the first blockchain function may include an indication of a number (or value) of cryptographic tokens requested. FIG. 2 illustrates a portion of a data structure 200 for a transfer request. Data structure 200 may include a source address field 203 that stores a source cryptographic address (e.g., a secondary cryptographic address). Data structure 200 may also include a target address field 206 that may store a target address (e.g., a cryptographic address associated with a vendor or another entity to which control of cryptographic tokens will be transferred). In addition, data structure 200 may include signature field 209 which may store a cryptographic signature, proving that the requestor controls the cryptographic address in target address field 206. Data structure 200 may include other fields. For example, data structure 200 may include a field for storing a number of cryptographic tokens requested, a transaction identifier (e.g., for determining whether to approve the transaction) and/or other fields.

A cryptographic token may be a data structure hosted on a blockchain. The cryptographic token may be assigned to be controlled by a cryptography-based storage application (e.g., a cryptographic wallet) at the time of creation. Some examples of cryptographic tokens include non-fungible tokens (NFTs) and fungible tokens. Fungible tokens may be tokens generated based on the ERC-20 standard while NFTs may be tokens generated based on the ERC-721 standard. Control of the cryptographic token may be exerted using a cryptographic address and a combination of a private key and a public key. The cryptography-based storage application may sign (e.g., using a cryptographic signature) a transaction request (e.g., a blockchain function request) using a private key, and a blockchain node executing the transaction request may confirm the validity of the cryptographic signature using a public key associated with the private key. In some embodiments, the cryptographic address may serve as a public key. Thus, the signer is able to prove control of the cryptographic tokens using a private key associated with the cryptographic address.

A cryptography-based storage application is sometimes referred to as a cryptographic wallet. The cryptography-based storage application may store a private key associated with a corresponding cryptographic address and may include software, hardware, or a combination of the two. For example, each cryptography-based storage application may include software executed on one or multiple devices or may include hardware such as a physical device. In some cases, the cryptography-based storage application may be software and may be stored in data nodes and a user of the cryptography-based storage application may access the cryptography-based storage application online (e.g., via a browser). Alternatively or additionally, the cryptography-based storage application may reside on a general-purpose computer or on a special device (e.g., a fob) intended for storing the cryptography-based storage application. For example, the device may store private keys in a memory of the device and allow transactions to be completed on the device itself. Examples of cryptography-based storage applications may include cryptographic wallets. Devices may include any suitable end-user computing devices (e.g., desktop computers, laptops, electronic tablets, smartphones, and/or other computing devices used by end users) capable of transmitting and receiving data such as requests and/or like transactions. For example, the cryptographic address may be a string of 32 alphanumeric characters and may identify what is sometimes referred to as a cryptographic wallet. Some examples of hardware cryptographic wallets include Ledger®, and Trezor®. Software cryptographic wallets may include Metamask® and others.

When the transfer request is received, communication subsystem 112 may pass at least a portion of the data included within the transfer request, or a pointer to the data in memory, to primary identification subsystem 114. Primary identification sub system 114 may include software components, hardware components, or a combination of both. For example, primary identification subsystem 114 may include software components that access and/or execute programs such as on-chain programs (e.g., smart contracts) that use and/or generate cryptographic tokens (e.g., Ethereum tokens, Bitcoin tokens, and/or other suitable tokens).

Primary identification subsystem 114 may determine that the first cryptographic address is a secondary cryptographic address associated with a primary cryptographic address that controls the one or more cryptographic tokens. In some embodiments, the first cryptographic address may be referred to as a source cryptographic address which will have control of cryptographic tokens. A corresponding cryptography-based storage application may use an associated private key to sign a blockchain function to transfer control of the cryptographic tokens to a target cryptographic address that may be controlled by another cryptography-based storage application. In some embodiments, a cryptographic address (e.g., source cryptographic address, target cryptographic address, etc.) may be an identifier of a cryptography-based storage application or another suitable identifier that indicates an entity or an application that controls a particular cryptographic token. Thus, any identifier that is enabled to be written into a data structure on a blockchain representing a cryptographic token may be a cryptographic address.

In some embodiments, primary identification subsystem 114 may determine that the first cryptographic address is a secondary cryptographic address associated with a primary cryptographic address that controls the one or more cryptographic tokens using the following operations. Primary identification subsystem 114 may determine that the first cryptographic address is associated with a record of a plurality of records linking primary cryptographic addresses with secondary cryptographic addresses. For example, primary identification subsystem 114 may access a database (e.g., residing on data node 104) storing primary cryptographic addresses with links to corresponding secondary cryptographic addresses. Thus, primary identification subsystem 114 may search the database for a record that contains the secondary cryptographic request received as part of the transfer request.

Primary identification subsystem 114 may use a link to the corresponding primary cryptographic address to identify that the received cryptographic address is a secondary cryptographic address, and also identify the corresponding primary cryptographic address. That is, primary identification subsystem 114 may, based on the first cryptographic address being associated with the record, determine that the first cryptographic address is the secondary cryptographic address. In some embodiments, each cryptographic address in the database may be marked as a primary cryptographic address or a secondary cryptographic address.

FIG. 3 illustrates a portion of a data structure 300 representing links between a primary cryptographic address and associated secondary cryptographic addresses. Field 303 may hold a primary cryptographic address while field 306 and field 309 may hold secondary cryptographic addresses associated with the primary cryptographic address. Thus, when a transfer request is received for a secondary cryptographic address (e.g., in field 306 or field 309), the system may use cryptographic tokens controlled by the primary cryptographic address in field 303 to satisfy the transfer request. Each cryptographic address may be associated with a particular cryptography-based storage application which may store a corresponding private key for use during transfers. Thus, primary identification subsystem 114 may use the following operations to identify the primary cryptography-based storage application that corresponds to the source cryptography-based storage application. Primary identification subsystem 114 may retrieve a first record of the plurality of records. The first record may include the source address with a plurality of secondary cryptographic addresses of the first record. For example, primary identification subsystem 114 may search a database (e.g., residing on data node 104) for the source address and find a first record (e.g., a data structure as shown in FIG. 3). Thus, primary identification subsystem 114 may retrieve the first data record (e.g., data structure 300 or a similar data structure) and extract the primary cryptographic address from the first data record.

In some embodiments, each cryptographic address, whether a primary cryptographic address or a secondary cryptographic address may be stored as an address in a database entry with a primary or secondary flag. In addition, the entry may have one or more fields storing links to other cryptographic addresses. For example, each entry for a secondary cryptographic address may store a link to a primary cryptographic address. Although the system is described as each secondary cryptographic address linked to a single primary cryptographic address, in some embodiments, each secondary cryptographic address may be linked to multiple primary cryptographic addresses. This enables transfers from multiple primary cryptographic addresses as needed. Each entry for a primary cryptographic address may include multiple links to corresponding secondary cryptographic addresses. Thus, in some embodiments, primary identification subsystem 114 may identify the primary cryptographic address that corresponds to the first cryptographic address based on a cryptographic address link associated with both the primary cryptographic address and the secondary cryptographic address.

In some embodiments, primary identification subsystem 114 may perform the following operations to identify the primary cryptographic address that corresponds to the first cryptographic address. Primary identification subsystem 114 may retrieve a first record of a plurality of records linking primary cryptographic addresses with secondary cryptographic addresses. The first record may include the first cryptographic address. As described above, a database may store records that may be searchable by cryptographic address. Thus, primary identification subsystem 114 may find the record in the database and retrieve the record.

When the record is retrieved, primary identification subsystem 114 may retrieve or extract, from the first record, the cryptographic address link associated with the first cryptographic address. As described above, each record may include one or more cryptographic address links. Thus, each entry for a secondary cryptographic address may have a link to a primary cryptographic address. Primary identification subsystem 114 may extract the primary cryptographic address using the cryptographic address link. For example, the link may be a link to another record within the database. The other record may be a record for the primary cryptographic address corresponding to the secondary cryptographic address.

When primary identification subsystem 114 determines that the first cryptographic address is a secondary cryptographic address, primary identification subsystem 114 may pass that indication to permissions subsystem 116. Permissions subsystem 116 may include software components, hardware components, or a combination of both. For example, permissions subsystem 116 may include software components that access and/or execute programs using hardware. Permissions subsystem 116 may determine whether transfer is allowed from one cryptographic address in the transfer request to the other cryptographic address in the transfer request. Thus, in response to determining that the first cryptographic address is the secondary cryptographic address, permissions subsystem 116 may determine, based on the first cryptographic address and the second cryptographic address, that transfer of control is permitted from the first cryptographic address to the second cryptographic address. For example, a user may have set up particular secondary cryptographic addresses (source addresses) for transactions with particular vendors (e.g., merchants) using particular cryptographic addresses (target addresses). That is, a particular source address may only be permitted to transfer control of cryptographic tokens to a particular target address. That way, a malicious user may not be able to trigger a transfer of control of cryptographic tokens from a source address (e.g., a secondary cryptographic address) to a different cryptographic address (e.g., a different target address associated with the malicious user).

In some embodiments, permissions subsystem 116 may use a mechanism described below to determine whether a particular source cryptographic address (e.g., as indicated in the transfer request) is allowed to transfer control of cryptographic tokens to a particular target address (e.g., as indicated in the transfer request). In particular, permissions subsystem 116 may retrieve the first cryptographic address and the second cryptographic address from the transfer request. The first cryptographic address may correspond to a source cryptographic address (e.g., the secondary cryptographic address) and the second cryptographic address may correspond to a target cryptographic address (e.g., a cryptographic address associated with a vendor).

When both addresses are retrieved, permissions subsystem 116 may use those addresses to determine whether to allow the transfer request. Thus, permissions subsystem 116 may determine whether a combination of the first cryptographic address and the second cryptographic address matches a permission entry of a plurality of permission entries. FIG. 4 illustrates a data structure 400 representing permissions for transferring control of cryptographic tokens from secondary cryptographic addresses. For example, data structure 400 may include fields 403 that store secondary cryptographic addresses and corresponding fields 406 for storing allowed target cryptographic addresses. Thus, entry 409 illustrates that a secondary cryptographic address within entry 409 is allowed to transfer control of cryptographic tokens to the corresponding target cryptographic address. In some embodiments, each secondary cryptographic address may be allowed to have multiple target cryptographic addresses and each target cryptographic address may be allowed to have multiple secondary cryptographic addresses. For example, a vendor may have multiple target cryptographic addresses for different types of products or services. In addition, a user may want to assign several secondary cryptographic addresses to a particular vendor for different types of products or services.

When permissions subsystem 116 determines that both cryptographic addresses are part of the same entry, permissions subsystem 116 may determine that transfer of control is allowed. In particular, based on determining that the combination of the first cryptographic address and the second cryptographic address matches the permission entry of the plurality of permission entries, permissions subsystem 116 may determine that the transfer of control is permitted from the first cryptographic address to the second cryptographic address. For example, permissions subsystem 116 may scan the database (e.g., storing data structure 400) for all entries of a particular source cryptographic address (e.g., first cryptographic address) and may compare the target cryptographic address to the other cryptographic address within the entry to determine whether the entry matches both addresses. If an entry matches both addresses, then permissions have been granted. In some embodiments, based on determining that the combination of the target address and the source address matches the permission entry, permissions subsystem 116 may determine that the source cryptography-based storage application is permitted to transfer control of the one or more cryptographic tokens to the target cryptography-based storage application. If no entry matches both addresses, permissions have not been granted.

In some embodiments, transfer authorization system 102 may receive a transfer request and determine that transfer of control of cryptographic tokens between the cryptographic addresses within the transfer request is not allowed. For example, a malicious user may attempt to duplicate a payment request from a vendor that the owner of the source cryptographic address transacts with on a regular basis. The malicious user may transmit the transfer request to transfer authorization system 102 so that cryptographic tokens are transferred to a cryptographic address associated with the malicious user. However, the malicious user has no control of a cryptography-based storage application of the vendor, thus, the malicious user must use a different cryptographic address that the malicious user controls. Accordingly, when transfer authorization system 102 receives such a transfer request, transfer authorization system 102 may reject the request and generate an alert.

Transfer authorization system 102 may perform the following operations in association with a transfer request from a target cryptographic address that is not permitted to receive control of cryptographic tokens from a particular source cryptographic address. Transfer authorization system 102 may receive a new transfer request for transferring control of a cryptographic token from the first cryptographic address to a third cryptographic address. For example, the third cryptographic address may be associated with a cryptography-based storage application controlled by a malicious user. Transfer authorization system 102 may perform normal transfer request processing as described above. As a result of that processing, transfer authorization system 102 may determine, based on the first cryptographic address and the third cryptographic address, that transfer of control is not permitted from the first cryptographic address to the third cryptographic address. For example, transfer authorization system 102 (e.g., via permissions subsystem 116) may search data structure 400 or another suitable data structure (e.g., a table in a database) for an entry that includes both the first cryptographic address (e.g., the source cryptographic address) and the third cryptographic address (e.g., the cryptographic address associated with a malicious user). However, transfer authorization system 102 may not locate an entry with those two cryptographic addresses. Thus, transfer authorization system 102 (e.g., via permissions subsystem 116) may generate a notification that the transfer is not permitted. The notification may include a source cryptographic address (e.g., the secondary cryptographic address), the target cryptographic address (e.g., the authorized address), and/or other information. In some embodiments, permissions subsystem 116 may include information indicating blockchain transactions associated with the target address and/or information recommending that the user stop using the secondary cryptographic address and create/select a new secondary cryptographic address.

Returning to the process where permissions subsystem 116 determines that the transfer is permitted, permissions subsystem 116 may pass an indication that the transfer request is permitted to blockchain transfer subsystem 118. Blockchain transfer subsystem 118 may include software components, hardware components, or a combination of both. For example, blockchain transfer subsystem 118 may include software components that access and/or execute programs using hardware. In some embodiments, blockchain transfer subsystem 118 may identify the primary cryptography-based storage application that corresponds to the source cryptography-based storage application. For example, each cryptographic address may be controlled by a cryptography-based storage application that stores a private key associated with the cryptographic address and is able to sign blockchain operations/functions (e.g., blockchain transactions) for transfer control of cryptographic tokens. In some embodiments, a single cryptography-based storage application may store multiple private keys for signing blockchain operations/functions.

Blockchain transfer subsystem 118 may generate one or more blockchain functions for performing one or more transfers of control for one or more cryptographic tokens. The first blockchain function may transfer control of one or more cryptographic tokens from a primary cryptographic address (e.g., associated with a primary cryptography-based storage application) to the secondary cryptographic address. In particular, blockchain transfer subsystem 118 may generate a blockchain function request for transferring control of the one or more cryptographic tokens controlled using the primary cryptographic address to be controlled using the first cryptographic address. That is, the first transfer of control of cryptographic tokens may be from a primary cryptographic address (e.g., using a cryptography-based storage application) to a secondary cryptographic address.

In some embodiments, blockchain transfer subsystem 118 may perform the following operations when generating the blockchain function. The blockchain transfer subsystem 118 may execute the cryptography-based storage application to retrieve a private key associated with the primary cryptographic address. For example, blockchain transfer subsystem 118 may execute the cryptography-based storage application. The cryptography-based storage application may retrieve the private key for the primary cryptographic address and generate a cryptographic signature using the private key. The cryptographic signature may be a cryptographic signature that may be authenticated by a blockchain node. Blockchain transfer subsystem 118 may insert the cryptographic signature into the blockchain function request. Blockchain transfer subsystem 118 may transmit the blockchain function request to be executed by a blockchain node.

Transfer authorization system 102 may then receive (e.g., via communication subsystem 112) a confirmation that the transfer of control has been committed to the blockchain. Once the blockchain function is committed to the blockchain, blockchain transfer subsystem 118 may transfer the cryptographic tokens to the target cryptographic address as specified by the transfer request. That is, blockchain transfer subsystem 118 may, based on the blockchain function request being successful, perform the transfer request using the blockchain node. The blockchain transfer subsystem 118 may generate another blockchain function request to perform the transfer. As part of the blockchain function request, blockchain transfer subsystem 118 may generate a cryptographic signature using a private key of a first cryptography-storage application associated with the first cryptographic address (e.g., the secondary cryptographic address). The signature generation may be a process performed for signing any blockchain transaction.

Blockchain transfer subsystem 118 may then insert into a new blockchain function the first cryptographic address, the second cryptographic address, and the cryptographic signature. The new blockchain function may be a blockchain transaction request to the blockchain node to transfer control of the cryptographic tokens controlled by the secondary cryptographic address (e.g., via a corresponding cryptography-based storage application) to be controlled by the target cryptographic address (e.g., a cryptographic address associated with a vendor). Blockchain transfer subsystem 118 may then transmit the new blockchain function to the blockchain node.

In some embodiments, blockchain transfer subsystem 118 may transmit the first blockchain function request to be executed (e.g., the blockchain function associated with the original transfer request) by the blockchain node based on the second blockchain function (the transfer of control between the primary cryptographic address and the secondary cryptographic address) being successful. For example, when the blockchain function to transfer control of the cryptographic tokens is transmitted to the blockchain node, blockchain transfer subsystem 118 may record the transmission of that function and await a result of the transfer (e.g., wait until this blockchain function is successful). Once the transmission is successful (e.g., based on a confirmation from the blockchain node), blockchain transfer subsystem 118 may submit, to the blockchain node, the blockchain function to transfer control of the cryptographic tokens to the target cryptographic address.

In some embodiments, all or some of blockchain transfer subsystem 118 may reside on a user device. For example, each user may have a user device (e.g., a smartphone, electronic tablet, computer, etc.) that may store a corresponding cryptography-based storage application and the associated private key. Thus, blockchain functions may be generated on a server or a user device and may be sent to the user device to be signed (e.g., using private keys residing on the user device). The signed transaction may then be transmitted to the server (e.g., that hosts transfer authorization system 102) and then may be sent to the blockchain node. In some embodiments, the user device may directly send the signed blockchain operation to the blockchain node for processing.

Figure 5:
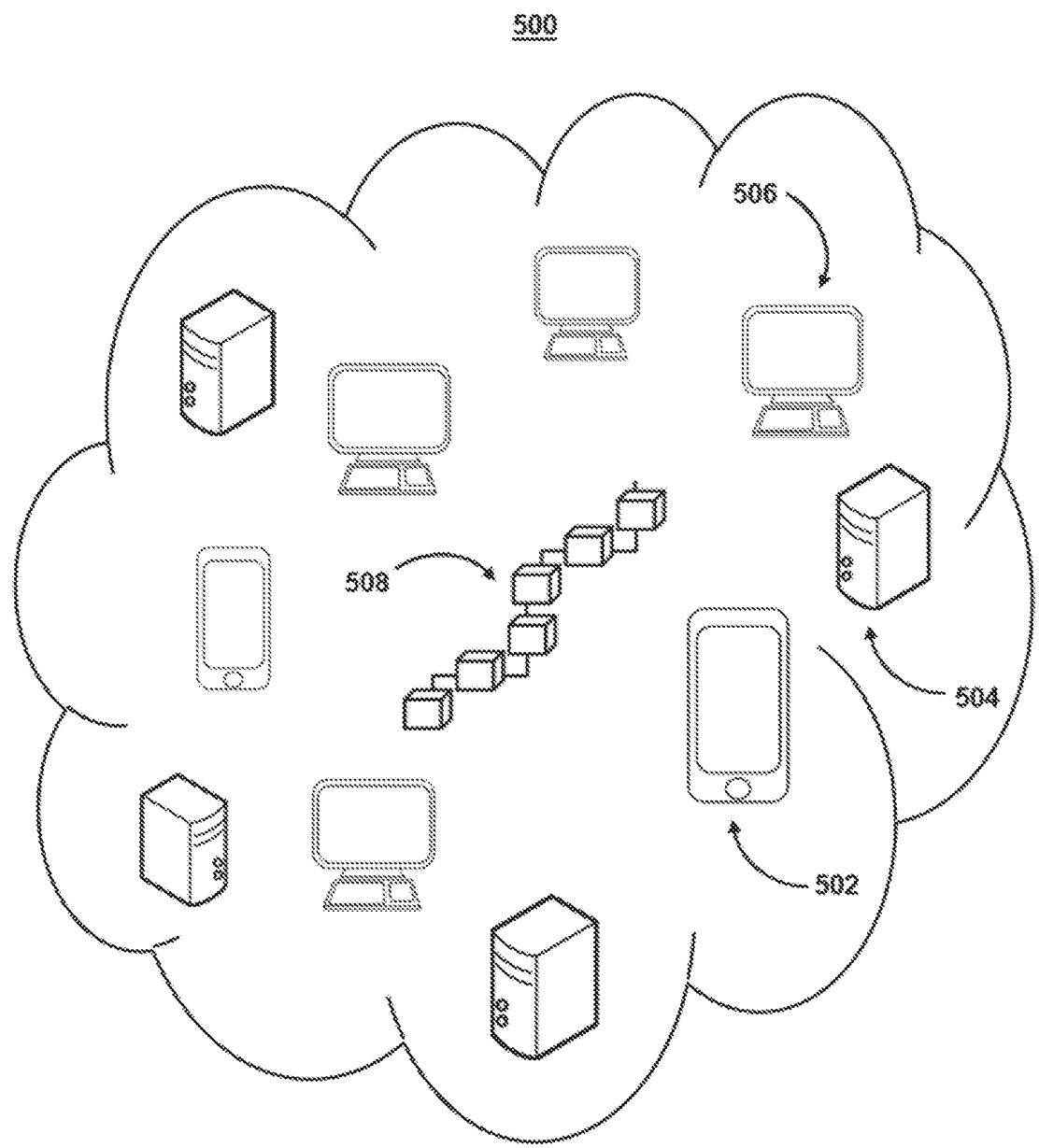
FIG. 5 illustrates an example of blockchain functionality, in accordance with one or more embodiments of this disclosure.

FIG. 5 shows an illustrative diagram of a decentralized environment for performing blockchain functions, in accordance with one or more embodiments. Blockchain functions described above may be performed using the devices (e.g., blockchain nodes, user devices, etc.) in FIG. 5. As shown in FIG. 5, system 500 may include multiple user devices (e.g., user device 502, user device 504, and/or user device 506). For example, system 500 may comprise a distributed state machine in which each of the components in FIG. 5 acts as a client of system 500. For example, system 500 (as well as other systems described herein) may comprise a large data structure that holds not only all accounts and balances but also a state machine that can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 500 may interact with, and facilitate the function of, blockchain 508.

It should be noted that, while shown as a smartphone, a personal computer, and a server in FIG. 5, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 500 performing a blockchain function may equally be applied to, and correspond to, an individual user device (e.g., user device 502, user device 506, and/or user device 506) performing the blockchain function. That is, system 500 may correspond to the user devices (e.g., user device 502, user device 504, and/or user device 506) collectively or individually.

Each of the user devices may be used by the system to conduct blockchain functions and/or contribute to authorizing transfers of control of cryptographic tokens. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a non-fungible token. A non-fungible token may comprise a token that is associated with a good, a service, a smart contract, and/or other content that may be verified by, and stored using blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 5, one or more user devices may include a concept of a digital wallet (e.g., sometimes referred to as a cryptography-based storage application) used to perform blockchain functions. For example, the digital wallet may comprise a repository that allows users to store and manage their private key(s) and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 5, one or more user devices may store a private key. For example, system 500 may use cryptographic systems for conducting blockchain functions such as transfers of control of cryptographic tokens (e.g., Bitcoin, Ethereum, USDC, etc.). For example, system 500 may use public-key cryptography, which features a pair of digital keys (e.g., which may comprise strings of data). In such cases, each pair comprises a public key (e.g., which may be public) and a private key (e.g., which may be kept private). System 500 may generate the key pairs using cryptographic algorithms (e.g., featuring one-way functions). System 500 may then encrypt a message (or other blockchain function) using an intended receiver's public key such that the encrypted message may be decrypted only with the receiver's corresponding private key. In some embodiments, system 500 may combine a message with a private key to create a digital signature on the message. For example, the digital signature may be used to verify the authenticity of blockchain functions. As an illustration, when conducting blockchain functions, system 500 may use the digital signature to prove to every node in the system that it is authorized to conduct the blockchain functions.

For example, system 500 may comprise a plurality of nodes for the blockchain network. Each node may correspond to a user device (e.g., user device 502). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 502 may request a blockchain function (e.g., conduct a transaction). The blockchain function may be authenticated by user device 504 and/or another node (e.g., a user device in the community network of system 500). For example, using cryptographic keys, system 500 may identify users and give access to their respective user accounts (e.g., corresponding digital wallets) within system 500. Using private keys (e.g., known only to the respective users) and public keys (e.g., known to the community network), system 500 may create digital signatures to authenticate the users.

Following an authentication of the blockchain function, the blockchain function may be authorized. For example, after the blockchain function is authenticated between the users, system 500 may authorize the blockchain function prior to adding it to the blockchain. System 500 may add the blockchain function to blockchain 508. System 500 may perform this based on a consensus of the user devices within system 500. For example, system 500 may rely on a majority (or other metric) of the nodes in the community network (e.g., user device 502, user device 504, and/or user device 506) to determine that the blockchain function is valid. In response to validation of the block, a node user device (e.g., user device 502, user device 504, and/or user device 506) in the community network (e.g., a miner) may receive a reward (e.g., in a given cryptocurrency) as an incentive for validating the block.

To validate the blockchain function, system 500 may use one or more validation protocols and/or validation (or consensus) mechanisms. For example, system 500 may use a Proof-of-Work (POW) mechanism in which a user device must provide evidence that it performed computational work to validate a blockchain function, and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 500 may use a Proof-of-Stake (POS) mechanism in which a user account (e.g., corresponding to a node on the blockchain network) is required to have, or "stake," a predetermined amount of tokens in order for system 500 to recognize it as a validator in the blockchain network.

In response to validation of the block, the block is added to blockchain 508, and the blockchain function is completed. For example, to add the blockchain function to blockchain 508, the successful node (e.g., the successful miner) encapsulates the blockchain function in a new block before transmitting the block throughout system 500.

Computing Environment

Figure 6:
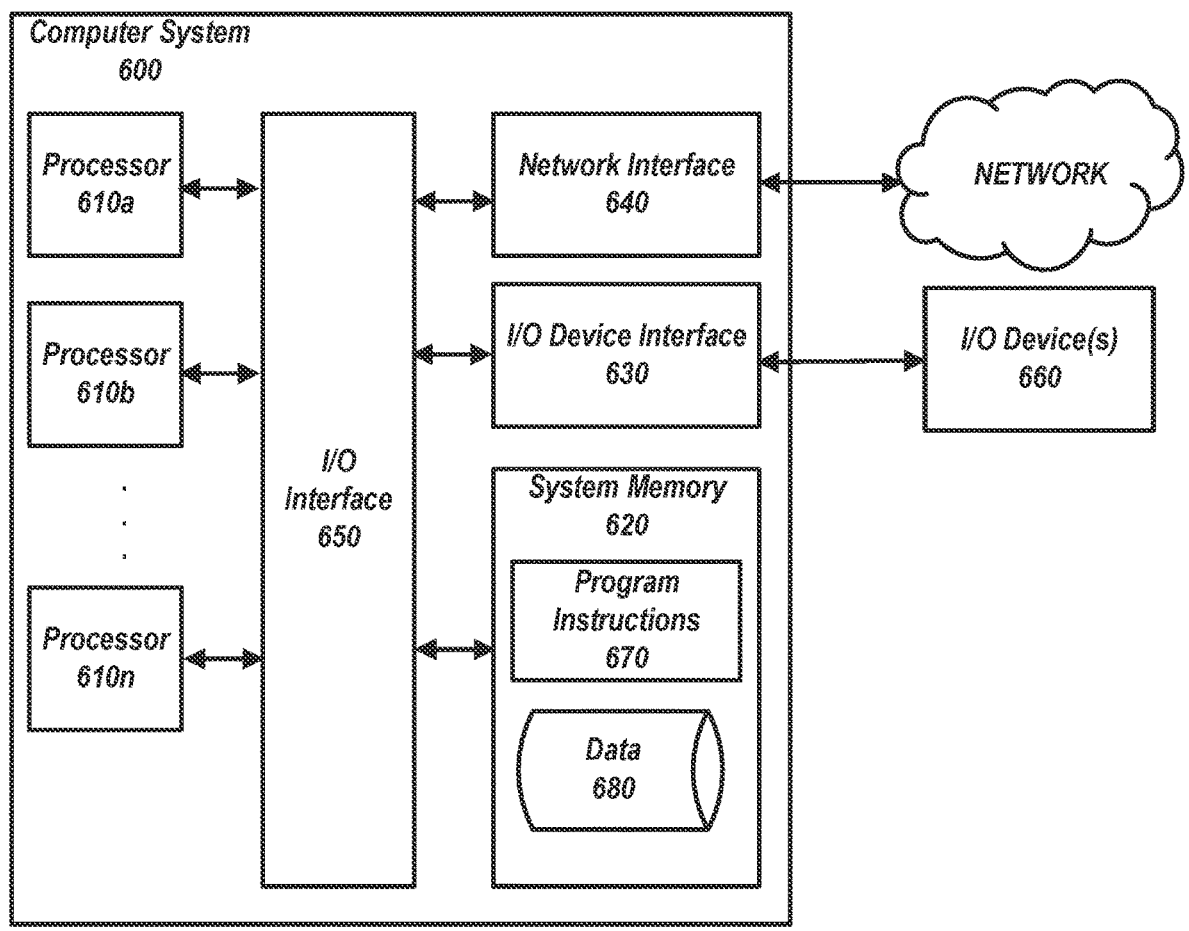
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uniprocessor system including one processor (e.g., processor 610*a*), or a multiprocessor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, (e.g., an FPGA (field-programmable gate array) or an ASIC (application-specific integrated circuit)). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions 670 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
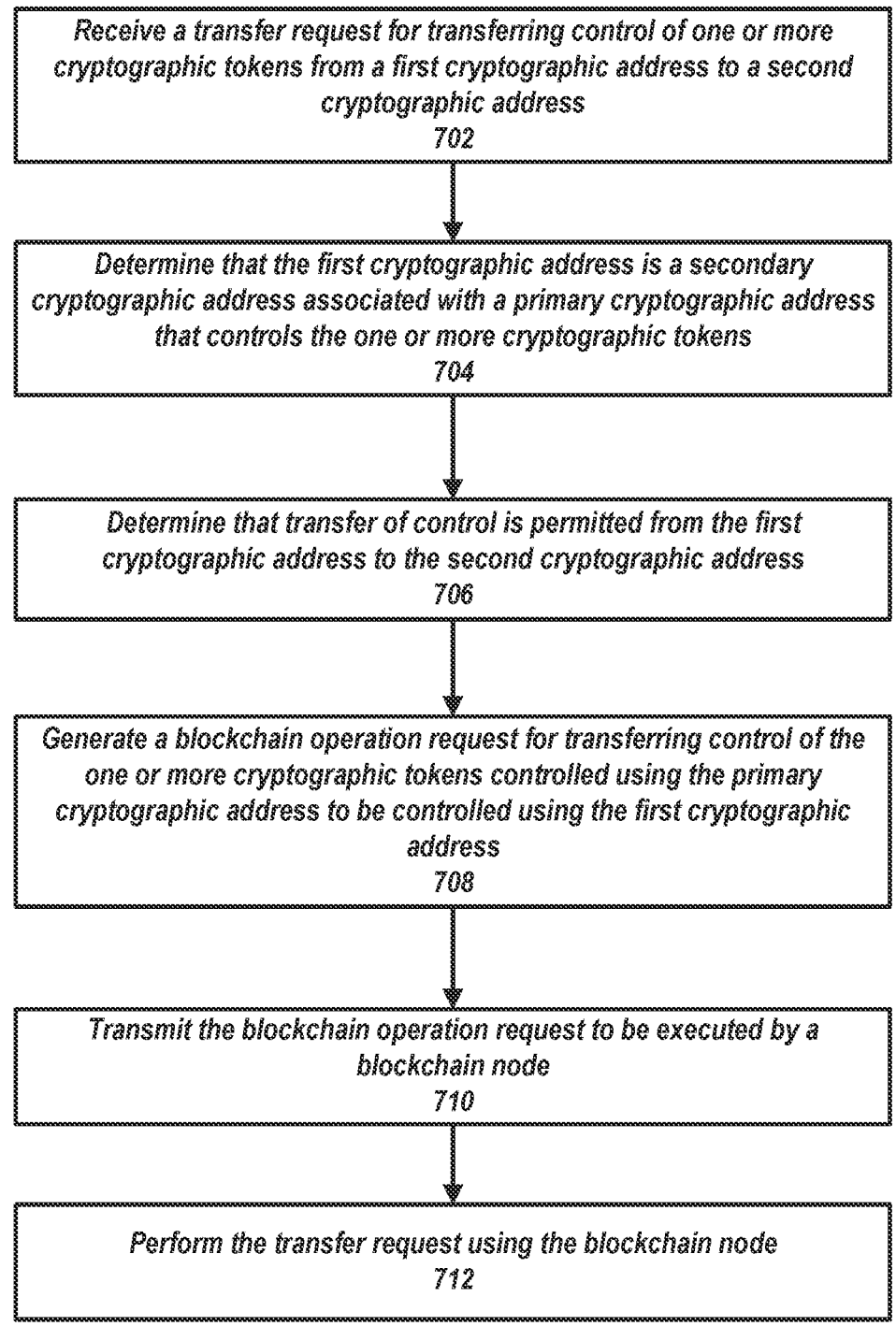
FIG. 7 is a flowchart of operations for preventing malicious transfers of control of cryptographic tokens, in accordance with one or more embodiments of this disclosure.

FIG. 7 is a flowchart 700 of operations for using cryptographic tokens to port account resources to multiple computing platforms. The operations of FIG. 7 may use components described in relation to FIGS. 5 and 6. In some embodiments, transfer authorization system 102 may include one or more components of computer system 600. At 702, transfer authorization system 102 receives a transfer request for transferring control of one or more cryptographic tokens from a first cryptographic address to a second cryptographic address. For example, transfer authorization system 102 may receive the transfer request from a computing platform of computing platforms 108a-108n, which may be a vendor providing goods or services. Transfer authorization system 102 may receive the transfer request using network interface 640 over network 150.

At 704, transfer authorization system 102 determines that the first cryptographic address is a secondary cryptographic address associated with a primary cryptographic address that controls the one or more cryptographic tokens. For example, transfer authorization system 102 may use one or more processors 610a, 610b, and/or 610n to perform this operation. At 706, transfer authorization system 102 determines, based on the first cryptographic address and the second cryptographic address, that transfer of control is permitted from the first cryptographic address to the second cryptographic address. Transfer authorization system 102 may use one or more processors 610a, 610b, and/or 610n to retrieve data entries from system memory 620 to perform this operation. In some embodiments, transfer authorization system 102 may use network interface 640 to pull the data from data node 104.

At 708, transfer authorization system 102 generates a blockchain function request for transferring control of the one or more cryptographic tokens controlled using the primary cryptographic address to be controlled using the first cryptographic address. Transfer authorization system 102 may use one or more processors 610a, 610b, and/or 610n to generate the blockchain function request and store that blockchain function request in system memory 620. At 710, transfer authorization system 102 transmits the blockchain function request to be executed by a blockchain node. For example, transfer authorization system 102 may transmit the blockchain function using network interface 640 over network 150. The transmission may be sent to a blockchain node of blockchain 508. At 712, transfer authorization system 102 performs the transfer request using the blockchain node. For example, transfer authorization system 102 may transmit a new blockchain function using network interface 640 over network 150. The transmission may be sent to a blockchain node of blockchain 508.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for preventing malicious transfers of control of cryptographic tokens, the method comprising: receiving a transfer request for transferring control of one or more cryptographic tokens from a first cryptographic address to a second cryptographic address; determining that the first cryptographic address is a secondary cryptographic address associated with a primary cryptographic address that controls the one or more cryptographic tokens; in response to determining that the first cryptographic address is the secondary cryptographic address, determining, based on the first cryptographic address and the second cryptographic address, that transfer of control is permitted from the first cryptographic address to the second cryptographic address; generating a blockchain function request for transferring control of the one or more cryptographic tokens controlled using the primary cryptographic address to be controlled using the first cryptographic address; transmitting the blockchain function request to be executed by a blockchain node; and based on the blockchain function request being successful, performing the transfer request using the blockchain node.

2. Any of the preceding embodiments, wherein determining that the first cryptographic address is the secondary cryptographic address associated with the primary cryptographic address that controls the one or more cryptographic tokens further comprises: determining that the first cryptographic address is associated with a record of a plurality of records linking primary cryptographic addresses with secondary cryptographic addresses; and based on the first cryptographic address being associated with the record, determining that the first cryptographic address is the secondary cryptographic address.

3. Any of the preceding embodiments, further comprising identifying the primary cryptographic address that corresponds to the first cryptographic address based on a cryptographic address link associated with both the primary cryptographic address and the secondary cryptographic address.

4. Any of the preceding embodiments, wherein identifying the primary cryptographic address that corresponds to the first cryptographic address further comprises: retrieving a first record of a plurality of records linking primary cryptographic addresses with secondary cryptographic addresses, wherein the first record comprises the first cryptographic address; retrieving, from the first record, the cryptographic address link associated with the first cryptographic address; and extracting the primary cryptographic address using the cryptographic address link.

5. Any of the preceding embodiments, wherein determining that the transfer of control is permitted from the first cryptographic address to the second cryptographic address further comprising: retrieving the first cryptographic address and the second cryptographic address from the transfer request; determining whether a combination of the first cryptographic address and the second cryptographic address matches a permission entry of a plurality of permission entries; and based on determining that the combination of the first cryptographic address and the second cryptographic address matches the permission entry of the plurality of permission entries, determining that the transfer of control is permitted from the first cryptographic address to the second cryptographic address.

6. Any of the preceding embodiments, wherein generating the blockchain function request for transferring control of the one or more cryptographic tokens further comprises: retrieving a private key from a primary cryptography-based storage application associated with the primary cryptographic address; generating a cryptographic signature using the private key; and inserting the cryptographic signature into the blockchain function request.

7. Any of the preceding embodiments, wherein performing the transfer request using the blockchain node further comprises: generating a cryptographic signature using a private key of a first cryptography-storage application associated with the first cryptographic address; inserting into a new blockchain function the first cryptographic address, the second cryptographic address, and the cryptographic signature; and transmitting the new blockchain function to the blockchain node.

8. Any of the preceding embodiments, further comprising: receiving a new transfer request for transferring control of a cryptographic token from the first cryptographic address to a third cryptographic address; determining, based on the first cryptographic address and the third cryptographic address, that transfer of control is not permitted from the first cryptographic address to the third cryptographic address; and generating a notification indicating that the transfer is not permitted.

9. A tangible, non-transitory machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for using secondary cryptography-based storage applications to prevent malicious transfers of control of cryptographic tokens from a primary cryptography-based storage application, the system comprising:

one or more processors; and
a non-transitory, computer-readable storage medium storing instructions that when executed by the one or more processors cause the one or more processors to perform operations comprising:
receiving a first blockchain function request for transferring control of one or more cryptographic tokens from a source cryptography-based storage application associated with a user to a target cryptography-based storage application associated with a requestor of the first blockchain function request, wherein the first blockchain function request comprises a source address of the source cryptography-based storage application and a target address of the target cryptography-based storage application;
determining that the source address is a secondary cryptographic address associated with a primary cryptographic address that controls the one or more cryptographic tokens;
in response to determining that the source address is the secondary cryptographic address, determining, based on the source address and the target address, that the source cryptography-based storage application is permitted to transfer control of the one or more cryptographic tokens to the target cryptography-based storage application;
identifying the primary cryptography-based storage application that corresponds to the source cryptography-based storage application;
generating a second blockchain function request for transferring control of the one or more cryptographic tokens controlled by the primary cryptography-based storage application to be controlled by the source cryptography-based storage application;
transmitting the second blockchain function request to be executed by a blockchain node; and
based on the second blockchain function request being successful, transmitting the first blockchain function request to be executed by the blockchain node.

2. The system of claim 1, wherein the instructions for determining that the source address is the secondary cryptographic address associated with the primary cryptographic address that controls the one or more cryptographic tokens cause the one or more processors to perform operations comprising:
determining, based on the source address, that the source address is associated with a record of a plurality of records linking primary cryptographic addresses with secondary cryptographic addresses; and
based on the source address being associated with the record, determining that the source address is the secondary cryptographic address.

3. The system of claim 2, wherein the instructions for identifying the primary cryptography-based storage application that corresponds to the source cryptography-based storage application cause the one or more processors to perform operations comprising:
retrieving a first record of the plurality of records, wherein the first record comprises the source address with a plurality of secondary cryptographic addresses of the first record; and
extracting the primary cryptographic address from the first record.

4. The system of claim 1, wherein the instructions for determining that the source cryptography-based storage application is permitted to transfer control of the one or more cryptographic tokens to the target cryptography-based storage application cause the one or more processors to perform operations comprising:
retrieving the target address and the source address from the first blockchain function request;
determining whether a combination of the target address and the source address matches a permission entry of a plurality of permission entries; and
based on determining that the combination of the target address and the source address matches the permission entry, determining that the source cryptography-based storage application is permitted to transfer control of the one or more cryptographic tokens to the target cryptography-based storage application.

5. A method for preventing malicious transfers of control of cryptographic tokens, the method comprising:
receiving a transfer request for transferring control of one or more cryptographic tokens from a first cryptographic address to a second cryptographic address;
determining that the first cryptographic address is a secondary cryptographic address associated with a primary cryptographic address that controls the one or more cryptographic tokens;
in response to determining that the first cryptographic address is the secondary cryptographic address, determining, based on the first cryptographic address and the second cryptographic address, that transfer of control is permitted from the first cryptographic address to the second cryptographic address;
generating a blockchain function request for transferring control of the one or more cryptographic tokens controlled using the primary cryptographic address to be controlled using the first cryptographic address;
transmitting the blockchain function request to be executed by a blockchain node; and
based on the blockchain function request being successful, performing the transfer request using the blockchain node.

6. The method of claim 5, wherein determining that the first cryptographic address is the secondary cryptographic address associated with the primary cryptographic address that controls the one or more cryptographic tokens further comprises:
determining that the first cryptographic address is associated with a record of a plurality of records linking primary cryptographic addresses with secondary cryptographic addresses; and
based on the first cryptographic address being associated with the record, determining that the first cryptographic address is the secondary cryptographic address.

7. The method of claim 5, further comprising identifying the primary cryptographic address that corresponds to the first cryptographic address based on a cryptographic address link associated with both the primary cryptographic address and the secondary cryptographic address.

8. The method of claim 7, wherein identifying the primary cryptographic address that corresponds to the first cryptographic address further comprises:
retrieving a first record of a plurality of records linking primary cryptographic addresses with secondary cryptographic addresses, wherein the first record comprises the first cryptographic address;
retrieving, from the first record, the cryptographic address link associated with the first cryptographic address; and
extracting the primary cryptographic address using the cryptographic address link.

9. The method of claim 5, wherein determining that the transfer of control is permitted from the first cryptographic address to the second cryptographic address further comprising:
retrieving the first cryptographic address and the second cryptographic address from the transfer request;
determining whether a combination of the first cryptographic address and the second cryptographic address matches a permission entry of a plurality of permission entries; and
based on determining that the combination of the first cryptographic address and the second cryptographic address matches the permission entry of the plurality of permission entries, determining that the transfer of control is permitted from the first cryptographic address to the second cryptographic address.

10. The method of claim 5, wherein generating the blockchain function request for transferring control of the one or more cryptographic tokens further comprises:
retrieving a private key from a primary cryptography-based storage application associated with the primary cryptographic address;
generating a cryptographic signature using the private key; and
inserting the cryptographic signature into the blockchain function request.

11. The method of claim 5, wherein performing the transfer request using the blockchain node further comprises:
generating a cryptographic signature using a private key of a first cryptography-storage application associated with the first cryptographic address;
inserting into a new blockchain function the first cryptographic address, the second cryptographic address, and the cryptographic signature; and
transmitting the new blockchain function to the blockchain node.

12. The method of claim 5, further comprising:
receiving a new transfer request for transferring control of a cryptographic token from the first cryptographic address to a third cryptographic address;
determining, based on the first cryptographic address and the third cryptographic address, that transfer of control is not permitted from the first cryptographic address to the third cryptographic address; and
generating a notification indicating that the transfer is not permitted.

13. A non-transitory, computer-readable storage medium storing instructions that when executed by one or more processors cause the one or more processors to perform operations comprising:
receiving a transfer request for transferring control of one or more cryptographic tokens from a first cryptographic address to a second cryptographic address;
determining that the first cryptographic address is a secondary cryptographic address associated with a primary cryptographic address that controls the one or more cryptographic tokens;
determining, based on the first cryptographic address and the second cryptographic address, that transfer of control is permitted from the first cryptographic address to the second cryptographic address;
generating and transmitting to a blockchain node, a blockchain function request for transferring control of the one or more cryptographic tokens controlled using the primary cryptographic address to be controlled using the first cryptographic address; and
based on the blockchain function request being successful, performing the transfer request using the blockchain node.

14. The non-transitory, computer-readable storage medium of claim 13, wherein the instructions for determining that the first cryptographic address is the secondary cryptographic address associated with the primary cryptographic address that controls the one or more cryptographic tokens further cause the one or more processors to perform operations comprising:
determining that the first cryptographic address is associated with a record of a plurality of records linking primary cryptographic addresses with secondary cryptographic addresses; and
based on the first cryptographic address being associated with the record, determining that the first cryptographic address is the secondary cryptographic address.

15. The non-transitory, computer-readable storage medium of claim 13, wherein the instructions further cause the one or more processors to identify the primary cryptographic address that corresponds to the first cryptographic address based on a cryptographic address link associated with both the primary cryptographic address and the secondary cryptographic address.

16. The non-transitory, computer-readable storage medium of claim 15, wherein the instructions for identifying the primary cryptographic address that corresponds to the first cryptographic address further cause the one or more processors to perform operations comprising:
retrieving a first record of a plurality of records linking primary cryptographic addresses with secondary cryptographic addresses, wherein the first record comprises the first cryptographic address;
retrieving, from the first record, the cryptographic address link associated with the first cryptographic address; and
extracting the primary cryptographic address using the cryptographic address link.

17. The non-transitory, computer-readable storage medium of claim 13, wherein the instructions for determining that the transfer of control is permitted from the first cryptographic address to the second cryptographic address further cause the one or more processors to perform operations comprising:
retrieving the first cryptographic address and the second cryptographic address from the transfer request;
determining whether a combination of the first cryptographic address and the second cryptographic address matches a permission entry of a plurality of permission entries; and
based on determining that the combination of the first cryptographic address and the second cryptographic address matches the permission entry of the plurality of permission entries, determining that the transfer of control is permitted from the first cryptographic address to the second cryptographic address.

18. The non-transitory, computer-readable storage medium of claim 13, wherein the instructions for generating the blockchain function request for transferring control of the one or more cryptographic tokens further cause the one or more processors to perform operations comprising:
retrieving a private key from a primary cryptography-based storage application associated with the primary cryptographic address;
generating a cryptographic signature using the private key; and
inserting the cryptographic signature into the blockchain function request.

19. The non-transitory, computer-readable storage medium of claim 13, wherein the instructions for performing the transfer request using the blockchain node further cause the one or more processors to perform operations comprising:
- generating a cryptographic signature using a private key of a first cryptography-storage application associated with the first cryptographic address;
- inserting into a new blockchain function the first cryptographic address, the second cryptographic address, and the cryptographic signature; and
- transmitting the new blockchain function to the blockchain node.

20. The non-transitory, computer-readable storage medium of claim 13, wherein the instructions further cause the one or more processors to perform operations comprising:
- receiving a new transfer request for transferring control of a cryptographic token from the first cryptographic address to a third cryptographic address;
- determining, based on the first cryptographic address and the third cryptographic address, that transfer of control is not permitted from the first cryptographic address to the third cryptographic address; and
- generating a notification indicating that the transfer is not permitted.

* * * * *